| United States Patent [19] | [11] 4,119,536 |
|---|---|
| Iwase et al. | [45] Oct. 10, 1978 |

[54] METHOD OF DISPOSING OF A FERROUS-ION CONTAINING ACIDIC AQUEOUS WASTE BY FORMING POLYCRYSTALLINE IRON COMPOUND PARTICLES

[75] Inventors: Keizo Iwase, Shiga; Toshio Takada; Masao Kiyama, both of Kyoto, all of Japan

[73] Assignee: Nippon Electric Co., Ltd., Tokyo, Japan

[21] Appl. No.: 503,598

[22] Filed: Sep. 16, 1974

[51] Int. Cl.$^2$ ................................................ C02C 5/04
[52] U.S. Cl. ...................................... 210/50; 210/52; 210/56; 423/DIG. 2
[58] Field of Search ............................... 210/42, 50–53, 210/59, 63, 56; 423/142, 594, DIG. 2; 75/109

[56] References Cited

U.S. PATENT DOCUMENTS

| 2,433,458 | 12/1947 | Kahn et al. | 210/53 |
|---|---|---|---|
| 2,692,229 | 10/1954 | Heise et al. | 210/50 |
| 3,167,390 | 1/1965 | Simpson et al. | 423/142 |
| 3,617,559 | 11/1971 | Cywin | 210/50 |
| 3,617,560 | 11/1971 | Deul | 210/50 |
| 3,647,686 | 3/1972 | Gunnarsson | 210/48 |
| 3,743,707 | 7/1973 | Iwase et al. | 423/594 |
| 3,822,210 | 7/1974 | Iwase et al. | 423/594 |

FOREIGN PATENT DOCUMENTS 1,142,214  2/1969  United Kingdom .................. 423/594

OTHER PUBLICATIONS

Pollutant Removal Handbook, p. 430–438.

*Primary Examiner*—Charles N. Hart
*Assistant Examiner*—Peter A. Hruskoci
*Attorney, Agent, or Firm*—Hopgood, Calimafde, Kalil, Blaustein and Lieberman

[57] ABSTRACT

On disposing of an acidic aqueous waste including ferrous ions, the ferrous ions are oxidized to produce iron compound precipitate in a remaining waste liquid. With the temperature of the waste kept between 50° C and 75° C and with pH of the waste liquid adjusted between 3.5 and 5.2, fine particles of the iron compound otherwise produced agglomerate into large polycrystalline particles. The large particles are readily separated from the waste liquid, which is now substantially neutral and transparent.

4 Claims, No Drawings

METHOD OF DISPOSING OF A FERROUS-ION CONTAINING ACIDIC AQUEOUS WASTE BY FORMING POLYCRYSTALLINE IRON COMPOUND PARTICLES

BACKGROUND OF THE INVENTION

This invention relates to a method of disposing of an acidic waste including ferrous or bivalent iron ions. The waste may be, for example, the waste lye of a pickle for articles made of iron and a waste that inevitably results during production of titanium white.

The waste generally includes, besides the ferrous ions, either halogen or sulfate ions and is strongly acidic. The waste should therefore be discharged either to sewerage or a river after disposed of to prevent pollution.

On disposing of the waste, it has been proposed to neutralize the waste, subject the waste to oxidation to form therein precipitate of iron oxides (containing more ferric ions than triiron tetroxide) and/or iron oxyhydroxide (FeOOH), and to remove the precipitate by filtration. The proposal has, however, been tried only on a small scale. This is because the precipitate of the iron compounds is formed in very fine particles and it has been difficult to remove the precipitate from the waste.

SUMMARY OF THE INVENTION

It is therefore an object of the present invention to provide a method of disposing of an acidic aqueous waste including ferrous ions, whereby it is possible to readily remove precipitate of iron compounds from the waste.

It is another object of this invention to provide a method of the type described, operable on a large scale.

A method of disposing of a ferrous-ion containing acidic aqueous waste comprises the steps of subjecting the waste to oxidation to produce precipitate of an iron compound in a remaining waste liquid and of separating the precipitate from the waste liquid. In accordance with this invention, the oxidation is carried out with the temperature of the waste kept between 50° C and 75° C and with pH of the waste liquid always adjusted between 3.5 and 5.2 by addition to the waste of a basic substance. Under the circumstances, fine iron compound particles which would otherwise be produced as the precipitate agglomerate into large polycrystalline particles of the iron compound. In addition, the waste liquid becomes a substantially neutral and transparent liquid after separation therefrom of the polycrystalline particles.

DESCRIPTION OF PREFERRED EMBODIMENTS

Before describing several preferred embodiments of the present invention, information obtained by Applicants through systematic experiments will be given at first in order to facilitate understanding of this invention.

Addition of a sodium hydroxide aqueous solution to a ferrous sulfate aqueous solution produced precipitate. When a mol ratio R of sodium hydroxide to ferrous sulfate is less than unity, a whitish suspension of ferrous hydroxide resulted, whose pH was between 7 and 9. By air oxidation, all whitish amorphous precipitate turned to green rust II irrespective of the oxidation temperature. Further oxidation by air of the green rust II at higher and lower temperatures yielded black ferromagnetic precipitate of triiron tetroxide and yellowish brown non-ferromagnetic precipitate of iron oxyhydroxide ($\alpha$-FeOOH and $\gamma$-FeOOH), respectively. Insofar as the green rust II was present, the pH was 6.0 ± 0.5. Temperatures at which the triion tetroxide was formed fell down as the mol ratio R approached unity.

Use of ferrous chloride, ferrous bromide, or ferrous iodide instead of ferrous sulfate resulted in production of green rust I rather than green rust II and facilitated formation of triiron tetroxide and $\gamma$-FeOOH. Temperatures at which the triiron tetroxide was produced fell further down. For example, the triiron tetroxide resulted at as low a temperature as 25° C from a suspension formed with a mol ratio R of 0.5.

Triiron tetroxide powder obtained rust a neutral suspension as above comprises spherical and cubic particles whose mean size is smaller than 0.1 micron. As described in the preamble of the instant specification, it is very difficult to subject the suspension of particles of these sizes to filtration on an industrial scale although it is somehow possible to do so on a small scale. More particularly, the triiron tetroxide precipitate produced through green rust I or II from the waste comprises particles brought into contact with one another to further impose difficulties on filtration. The facts described also apply to iron oxyhydroxide. In addition, the waste of the type described usually contains oxidation products of a portion of the ferrous ions and a small amount of organic substance, which additional components tend to suppress growth of the triiron tetroxide particles particularly when pH of the ferrous hydroxide suspension is 6 or more. This renders it more difficult to carry out the filtration.

In contrast, it has now been discovered that large particles of iron compounds are produced when a ferrous-ion containing acidic aqueous solution is subjected to oxidation with formation of intermediate oxidation products, such as ferrous hydroxide, ferrous carbonate, ferrous basic salts, and green rust, avoided. The large particles are formed by positive agglomeration or coalescence of fine particles of the iron compounds, such as fine granular particles of ferromagnetic triiron tetroxide and fine needle-like particles of non-ferromagnetic iron oxyhydroxide.

In accordance with a method of disposing of a ferrous-ion containing acidic aqueous waste according to an embodiment of this invention, a basic substance is added to the waste to neutralize the excess acid radicals. The basic substance may be a hydroxide of sodium, ammonium, potassium, magnesium, and calcium or an oxide or a carbonate of such substances. It is important on neutralization to always avoid formation of ferrous salt precipitate, such as ferrous hydroxide, ferrous carbonate, and green rust. The basic substance should not therefore be added to the waste to raise pH of the waste above 5.2. Thereafter, the waste is subjected to oxidation with the temperature of the waste kept between 50° C and 75° C. The oxidation produces precipitate of iron compounds, such as triiron tetroxide and iron oxyhydroxide, and acid ions in a remaining waste liquid. The iron compound precititate is produced at a higher rate as the temperature of the waste and pH of the remaining waste liquid are higher. At temperatures below 50° C and with the pH values less than 4.0, production of the precipitate is too slow to carry out the method on an industrial scale although the pH values between 3.5 and 4.0 are acceptable. It is now necessary to neutralize the acid produced during the oxidation by further addition to the waste of a basic substance to keep pH of the waste liquid always between 3.5 and 5.2, preferably, between 4.0 and 5.2. Besides the economy of heat, temperatures above 75° C are objectionable because formation of the precipitate becomes too fast to render it difficult to keep the pH value at 5.2 or less. The precipitate comprises large black spongy ferromagnetic triiron tetroxide particles and large brown burry non-ferromagnetic iron oxyhydroxide particles when the temperature and the pH are higher and when the temperature and the pH are lower, respectively. After all ferrous ions are oxidized, pH of the waste liquid suddenly rises substantially to 7. Due to large sizes of the precipitate particles, it is very easy to separate the precipitate from the waste liquid. The separation may be carried out by filtration. Alternatively, a magnetic field may be applied to the waste treated as above to remove the ferromagnetic precipitate from the waste.

Several preferred examples of the methods according to this invention will be given hereunder.

EXAMPLE 1

Five liters of a 0.24-mol/liter ferrous chloride aqueous solution containing excess hydrogen chloride were continually heated to 50° C. Air containing ammonia gas was blown into the solution at a rate of 250 liters/hour to oxidize the ferrous ions. The concentration of the ammonia gas in the carrier air flow was adjusted to maintain pH of the solution at 5.0. With the progress of oxidation, the amount of precipitate increased until the whole ferrous ions changed to black iron compound precipitate, when the pH suddenly rose to about 6.5. It was very easy to separate the precipitate from the mother liquor by filtration. It was also easy to remove the precipitate from the waste by the use of a magnetic field.

EXAMPLE 2

Five liters of a 0.24-mol/liter ferrous sulfate sulfuric-acid aqueous solution were continually heated to 70° C. Air containing ammonia gas was blown into the solution at a rate of 250 liters/hour to oxidize the ferrous ions. As in Example 1, the concentration of the ammonia gas in the air flow was adjusted to maintain pH of the solution at 5.2. With the progress of oxidation, the amount of precipitate increased until lapse of 1 ½ hours when the whole ferrous ions changed to black iron compound precipitate and when the pH suddenly to about 8. It was very easy to separate the precipitate from the mother liquor either by filtration or by the use of a magnetic field.

EXAMPLE 3

A 0.5-mol/liter ferrous sulfate aqueous solution acidified with sulfuric acid had a pH of 2.2. Three liters of the solution were kept by heating at a temperature of 70° C. Ammonia gas was blown into the solution to maintain pH of the solution at 4.5 ± 0.2. Air was also blown into the solution at a rate of 200 liters/hour. With the progress of oxidation, dispersed phase of $\alpha$-FeOOH was produced in brownish yellow dispersoid in an amount proportional to the amount of ammonia gas blown into the solution until lapse of 4 hours, when pH of the dispersoid suddenly rose from 4.5 to 7.1 as a result of complete oxidation of the ferrous ions. It was very easy to separate by filtration the precipitate from a transparent ammonium sulfate solution.

After rinsed with water and dried at 130° C, the precipitate yielded 130 grams of yellowish brown or yellow powder. The powder comprised burry particles of the sizes between 1 and 2 microns and had a tap density of about 1. The results of chemical analysis showed an $SO_3$ content of 0.81%. It has been confirmed that the powder is excellent as iron oxide for preparation of ferrites. The color of the powder became reddish brown at 600° C. It has also been confirmed that the latter powder is useful as reddish brown pigment. When ball-milled, the yellowish brown or yellow powder turned reddish.

What is claimed is:

1. In a method of disposing of an acidic aqueous waste liquid containing ferrous ions, wherein said acidic liquid is raised in pH value by adjustment with a base and subjected to oxidation by passing air therethrough to produce a precipitate of an iron compound, the improvement comprising the steps of:

carrying out said oxidation at a temperature ranging from about 50° C to 75° C while adjusting and maintaining the pH of said aqueous waste liquid at the range of about 3.5 to 5.2 by flowing air containing ammonia gas through said liquid, whereby to produce an iron compound precipitate in the form of easily filterable polycrystalline particles comprising agglomerates of fine particles, and then separating said precipitate from said aqueous waste liquid, thereby producing a substantially neutral and transparent liquid.

2. A method as claimed in claim 1, wherein said pH is maintained between about 4.0 and 5.2.

3. A method as claimed in claim 2, wherein said oxidation is carried out until said pH shows that said waste liquid has become substantially neutral.

4. A method as claimed in claim 1, wherein adjustment of said pH is carried out by adjusting the rate of flow of said ammonia gas.

* * * * *